(12) United States Patent
Smith

(10) Patent No.: US 10,313,500 B2
(45) Date of Patent: Jun. 4, 2019

(54) MOBILE DEVICE GRIP

(71) Applicant: Stephen Lorance Smith, Cibolo, TX (US)

(72) Inventor: Stephen Lorance Smith, Cibolo, TX (US)

( * ) Notice: Subject to any disclaimer, the term of this patent is extended or adjusted under 35 U.S.C. 154(b) by 505 days.

(21) Appl. No.: 13/998,301

(22) Filed: Oct. 18, 2013

(65) Prior Publication Data
US 2015/0111621 A1    Apr. 23, 2015

(51) Int. Cl.
*H04M 1/00* (2006.01)
*H04M 1/02* (2006.01)
*H04B 1/3888* (2015.01)

(52) U.S. Cl.
CPC ........ *H04M 1/0279* (2013.01); *H04B 1/3888* (2013.01); *H04M 1/0281* (2013.01)

(58) Field of Classification Search
USPC ............................. 455/575.1, 575.3; 370/338
See application file for complete search history.

(56) References Cited

U.S. PATENT DOCUMENTS

| | | | | |
|---|---|---|---|---|
| 7,162,281 B2 * | 1/2007 | Kim | ........................... | 455/575.1 |
| 7,379,303 B2 * | 5/2008 | Miyamura et al. | ........... | 361/715 |
| 7,632,023 B2 * | 12/2009 | Misawa | ........................ | 396/348 |
| 7,756,552 B2 * | 7/2010 | Haikola et al. | ............. | 455/569.2 |
| 8,314,883 B2 * | 11/2012 | Richardson et al. | ......... | 348/376 |
| 8,488,080 B2 * | 7/2013 | Ikeda | ............................... | 349/65 |
| 2004/0253972 A1 * | 12/2004 | Iwai | ........................ | H01Q 1/12 455/550.1 |
| 2011/0064401 A1 * | 3/2011 | Desorbo | ................ | G03B 17/00 396/419 |
| 2013/0009890 A1 * | 1/2013 | Kwon | ........................... | 345/173 |

* cited by examiner

*Primary Examiner* — Marcos Batista
(74) *Attorney, Agent, or Firm* — Robert E. Wise

(57) ABSTRACT

A mobile device has at least one grip handle disposed on the back surface of the mobile device. The grip handle comprises at least one grip surface that enables a user to grasp the mobile device and use it with one hand of the user. Various embodiments of the invention are disclosed.

3 Claims, 24 Drawing Sheets

MOBILE DEVICE GRIP

CROSS-REFERENCES TO RELATED APPLICATIONS

The present application claims the benefit of 35 U.S.C. § 111(b) U.S. Provisional Application Ser. No. 61/795,496, filed Oct. 18, 2012, entitled "Mobile Device Grip".

STATEMENT REGARDING FEDERALLY-SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING

Not Applicable

BACKGROUND OF THE INVENTION (1) Field of the Invention

This invention relates to grips that help the human hand(s) to better grasp mobile devices.

(2) Description of the Related Art

Some mobile devices are small enough to be grasped on both sides by a normal human hand. However, other mobile devices are too large to conveniently grasp both sides with the normal human hand. These devices have, in the past, been typically held by grasping one edge or balancing it in the palm of the hand. Doing either of these is inconvenient. Typically, people must use two hands to securely hold the device. But then people do not have a free hand to tap, scroll, or otherwise address the mobile device manually.

On small tablet computers and cell phones, people typically use, or want to use, one hand to hold the mobile device. People tend to hold smaller devices more toward the fingertips of their hand, leaving their thumb free to curl around the front of the device so that the thumb can reach and touch all points on the screen of the device. By using only one hand on the device, people can use their other hand to open doors, carry objects, hold a child's hand, and so forth. However, some cell phones and many tablet computers are getting too wide to do this comfortably.

Mobile devices may include cell phones, iPods, iPads, tablet computers, handheld computers, PDAs, and other types of devices. In particular, tablet computers are becoming very popular in the market, and most are too large to be conveniently held with one hand. Users of tablet computers and other types of mobile devices usually need a free hand so that they can address the device with one or more fingers of the free hand. Addressing the device may include tapping or placing one or more fingers of the free hand on the device's screen to enter information or control the device.

It would be desirable if there was a way to conveniently, comfortably, and reliably grasp a mobile device with only one hand of a person. One sort of grasping mechanism is the "Flygrip" which can be viewed at www.flygrip.com. However, the Flygrip is undesirable for multiple reasons.

Typically, grasping of an object will occur by the person placing the thumb against one edge, placing one or more fingers of the same hand against the opposing edge, and then squeezing the thumb toward the fingers or vice versa. The two edges are typically opposing in that the surface of the first edge on which the thumb is placed is oriented roughly 180 degrees away from the surface of the second edge on which the finger(s) are placed. The distance between the two opposing edges is a matter of design choice, but typically is chosen to be a distance which most people can comfortably spread their fingers from their thumb. It should also be noted that people can use the portion of the hand's palm directly below the thumb, called the thenar, which is also movable in the same manner as the thumb itself.

BRIEF SUMMARY OF THE INVENTION

A mobile device can be any device having a display screen (which might be a touch screen) and associated electronics, which is small enough and light enough for some persons to hold it in one hand. Mobile devices may include smart phones, cell phones, tablet computers, iPads, control units, display screens, touch screens, remote control devices, and other such devices. This list is not inclusive.

My invention is the provision a grip on the back of the mobile device, the grip being of a size which can be conveniently and comfortably gripped by one hand of a person. The grip handles are made of a material that is both sturdy and can be grasped securely by the human hand. The grip can be integrally formed in the back of the mobile device, or it can be one or more separate pieces that are attached to the back of the mobile device. The grip may have only one position, or it may have two or more positions. For example, the grip may comprise one or more handles. At least one of the handles may fold down into or flat against the back side of the mobile device. Alternatively, at least one of the handles of the grip may move between three or more positions. One position could be a completely folded position where grasping is not possible; a second position could be a completely open position where grasping is possible; other positions may be intermediate positions where grasping is possible from different angles.

The grip and/or the grip mounting elements can be formed integrally with the mobile device or with its protective case, or the grip and/or the grip mounting elements can be separate elements that are attached to the mobile device or its protective case with screws, magnets, adhesive, or any other suitable means.

The grip of my invention can be placed on the housing or body of the mobile device, or to a cover device that at least partially encloses the mobile device. As long as the grip will enable a person to relatively securely grasp and hold with one hand the mobile device, or something that is holding it, then it comes within the scope of my invention.

Any handle that has more than one position can be spring-loaded so that it is biased to normally reside in one position but can be easily moved to another position. Any movable handle can be attached at a pivot point by any known mechanism such as a hinge or a pivot. The movable handle can be fastened in one position by any known mechanism such as a click fastener, a lock mechanism, a magnet or the like.

The edge of the handle can be arranged in different ways. The edge may be flat or curved or formed into multiple "finger holds". If two handles are provided, or if one handle has two sides, then each handle or side may be formed differently. One might be formed for a thumb and the other for one or more fingers. The handles may be formed for being held by the right or the left hand of a person. Alternatively, the handle may be made such that its orientation can be reversed: one way for being gripped by the right hand and the other way for being gripped by the left hand. Alternatively, the handle(s) may be uni-directional and capable of being gripped by either the right or left hand comfortably.

The handle(s) may extend from the back of the mobile device or they could be recessed into the device. If the handle(s) are to be attached to the device after it is manufactured, the handle(s) may be recessed into a mostly flat body and the body itself attached to the mobile device so that it has a mostly flat back with the gripping handle(s) recessed therein.

If the back of the mobile device and/or the grip itself has or results in any open space in the mobile device as a whole, that open space can be used as storage for any other suitable item. For example, a stylus or a writing instrument or paper or keys or credit cards or any other suitable item could be stored in such an open space.

The grip can be formed of any one or more of metal, plastic, rubber, glass, wood, foam, gel or any other suitable material that is sufficiently strong, light, and graspable. If a particular material is not sufficiently graspable, the surface which the person will grasp can be roughened or notched in some manner to provide better graspability. For example, steel or aluminum tend to be slippery to a human hand or finger, so it may be desirable to roughen the surface which the thumb, finger, or hand will grasp to provide better purchase.

The grip can be made from a metal or plastic bar. There may be one bar, in which case the person will use one hand to grasp one edge of the device and the one bar. Or there may be two bars, in which case the person could use one hand to grasp both bars. Alternatively, a person could use one of the two bars for right-handed use in conjunction with one edge of the mobile device, or the person could use the other of the two bars for left-handed use in conjunction with the opposite edge of the mobile device.

DETAILED DESCRIPTION OF THE INVENTION

Mobile devices are suited for a person to hold with one or both hands. Mobile devices come in many different sizes. Some devices can be easily and conveniently held with one hand, but some devices have a size or width or shape that makes them less easy or convenient to hold with one hand. For example, the Apple iPhone 4 has a width and size that can be comfortably grasped with one hand by many, if not most, people. The Samsung Galaxy SIII, however, is about 12 millimeters wider and, as such, cannot be comfortably and securely grasped in one hand by many people.

Figure 1:
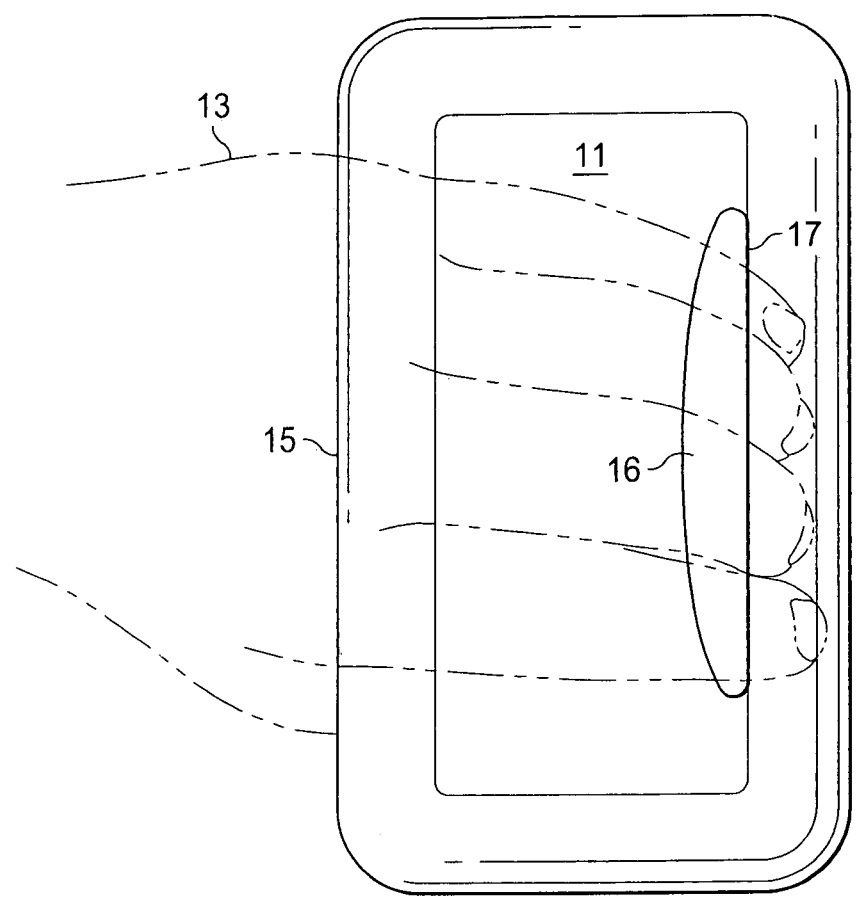
FIG. 1 shows the first preferred embodiment of the invention.

FIG. 1 shows a first preferred embodiment of my invention. The back side 11 of a mobile device is shown gripped in the hand 13 of a person, such that the display screen of the mobile device can be conveniently oriented toward the eyes of the person holding the device. One edge 15 of the mobile device is shown nestled into the palm of one hand of the person. The fingers of that hand are shown grasping an elongated finger grip 16 disposed on the back of the device or its protective cover. By squeezing between the palm and fingers the edge of the mobile device and the finger grip, the person can easily, comfortably, and securely hold and manipulate the mobile device with one hand, even if the device itself is too wide for that hand to conveniently and securely hold the device without the elongated finger grip. The finger grip 16 has at least one gripping surface 17 that is approximately perpendicular to the plane of the back of the mobile device.

Figure 2:
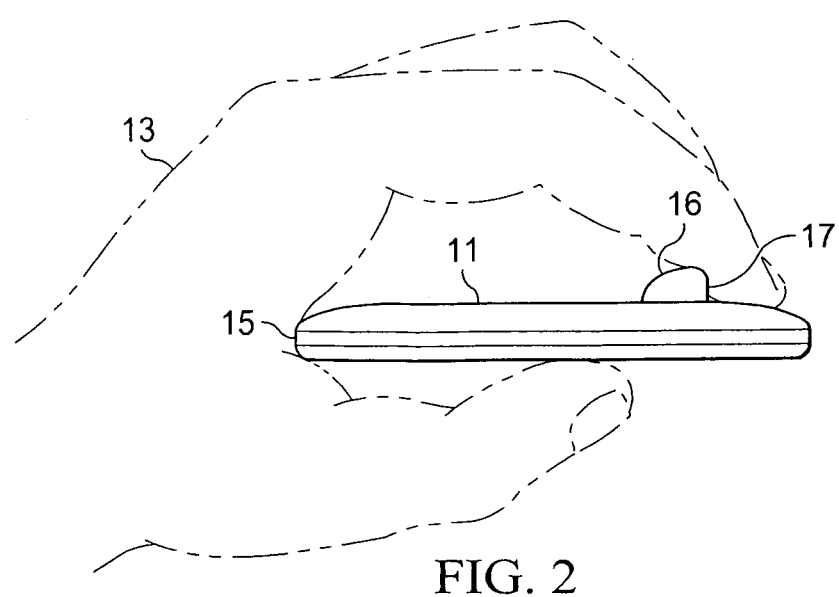
FIG. 2 shows an end view of FIG. 1.

FIG. 2 shows an end view of FIG. 1. The finger grip 16 shown in FIG. 1 can be disposed at any suitable location on the back of the mobile device. A typical disposition is shown in FIGS. 1 and 2, but the finger grip 16 could be disposed at any position on the back 11 of the mobile device. Location would normally depend on the size of the hand 13 of the person who will use the device.

The finger grip 16 shown in FIGS. 1 and 2 can be integrally molded with the housing of the mobile device at the time it is manufactured, or it could be attached to the back 11 of the mobile device at a later time. If it is attached later, it can be attached with a suitable adhesive or by welding, tacking, or the like, or it could be attached with screws, rivets, strong magnets, or the like. Any suitable attachment means which holds the finger grip 16 securely to the mobile device (or its protective cover) will accomplish the purpose of this invention. Alternatively, one may provide multiple mounting points along the back side 11 of the mobile device and provide a finger grip 16 that can be removably attached such that a person could attach it at one location, remove it, and re-attach it at a different location on the back 11 of the mobile device. Alternatively, the finger grip 16 may be part of an attachment piece on which it can be moved between two or more positions. The attachment piece would be attached to the mobile device and then the finger grip part of the attachment piece could be moved between multiple positions, at each of which it could be secured.

It is apparent from FIGS. 1 and 2 that the size of the finger grip 16 is not critical as long as the human hand 13 or fingers for which it is designed can grasp it securely and in relative comfort. The actual size and shape of the finger grip 16 is a matter of design choice which can be chosen by persons of ordinary skill in this art who have learned of this invention.

Although the finger grip 16 shown in FIGS. 1 and 2 is shown with a curved portion on one side, the finger grip 16 could be made with a square or rectangular cross-section, such that it could be gripped by a person's fingers on either side of the finger grip 16, thereby making it suitable for being held by either the right or left hands of the person.

Figure 3:
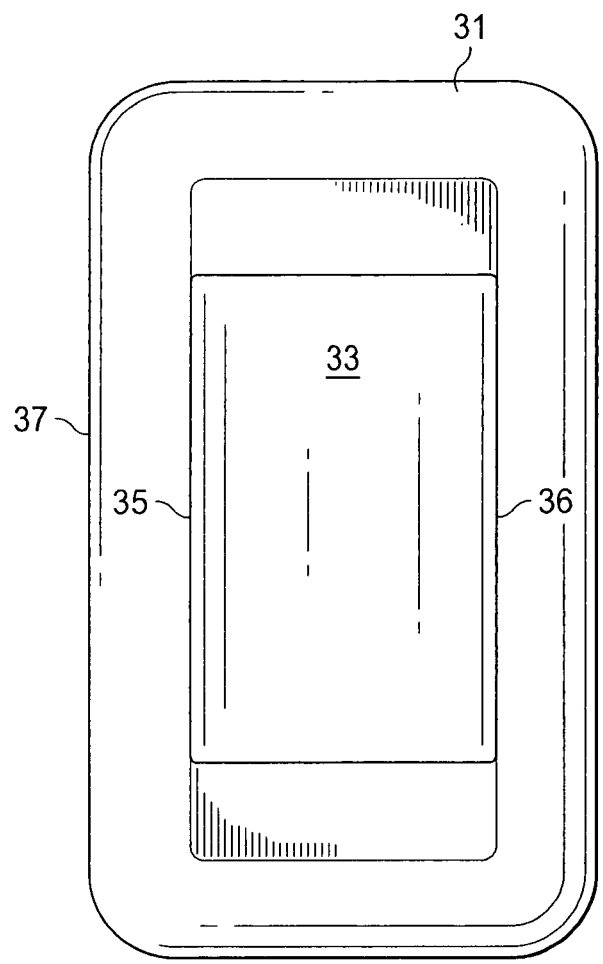
FIG. 3 shows a second preferred embodiment of the invention.
Figure 4:
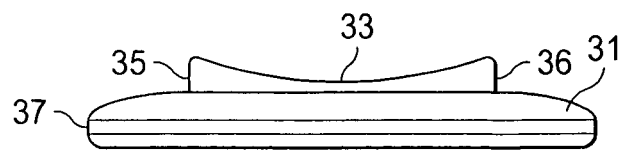
FIG. 4 shows an end view of FIG. 3.

FIGS. 3 and 4 show a second preferred embodiment of this invention. A typical mobile device 31 has a gripping device 33 on its back side, which is the side opposite the display screen. An end view of FIG. 3 is shown in FIG. 4. The shape of the gripping device 33 can be seen from FIG. 3 and FIG. 4. The gripping device has two opposing gripping surfaces 35 and 36 spaced a suitable distance apart. The gripping device 33 comprises two separate gripping surfaces 35 and 36 that are each roughly perpendicular to the back surface of the device 31. The two gripping surfaces 35 and 36 face in opposite directions as is apparent from the drawing. Each gripping surface 35 and 36 extends a predetermined distance along the length of the back of the device 31. The size of the gripping surface 35 or 36, both its width and its length, are matters of design choice. A person of ordinary skill in this art, having learned of this invention, will be able to choose these sizes to accommodate some, most, or all human fingers as the design of the device might require. In addition, while the gripping surfaces 35 and 36 shown in FIGS. 3 and 4 are parallel to one another, it is possible to angle them with respect to one another as long as the hand will be able to grasp the device conveniently and securely.

One possible manner of using the embodiment shown in FIGS. 3 and 4 is for a person to place one or more fingers on one opposing gripping surface, and place either the thumb or the thenar of the hand on the other opposing surface. By squeezing, the person can securely hold and manipulate the mobile device with one hand. It is apparent from the drawings that the gripping device 33 is narrower than the mobile device 31. The exact shape of the gripping device 33 is a matter of design choice as long as it can be securely and comfortably grasped by one hand of a human. If the gripping device 33 is hollow, it could be used to store items inside it. The gripping device 33 can be formed integrally with the housing of the mobile device 31 or integrally with a cover used to partially enclose it. Alternatively, the gripping device 33 can be a separate device that is attached to the mobile device 31 or its cover.

A second possible manner of using the embodiment shown in FIGS. 3 and 4 is for a person to cradle a first edge 37 of the mobile device in the crevice between the palm's thenar and hypothenar, and to grasp with the fingers the grip surface 36 opposite the first edge. This enables the thumb to arch over the top surface of the mobile device 31 and tap its screen at all possible points on the screen. A person of ordinary skill in this art would be able to devise other obvious ways of using the embodiment shown in FIGS. 3 and 4.

Figure 5:
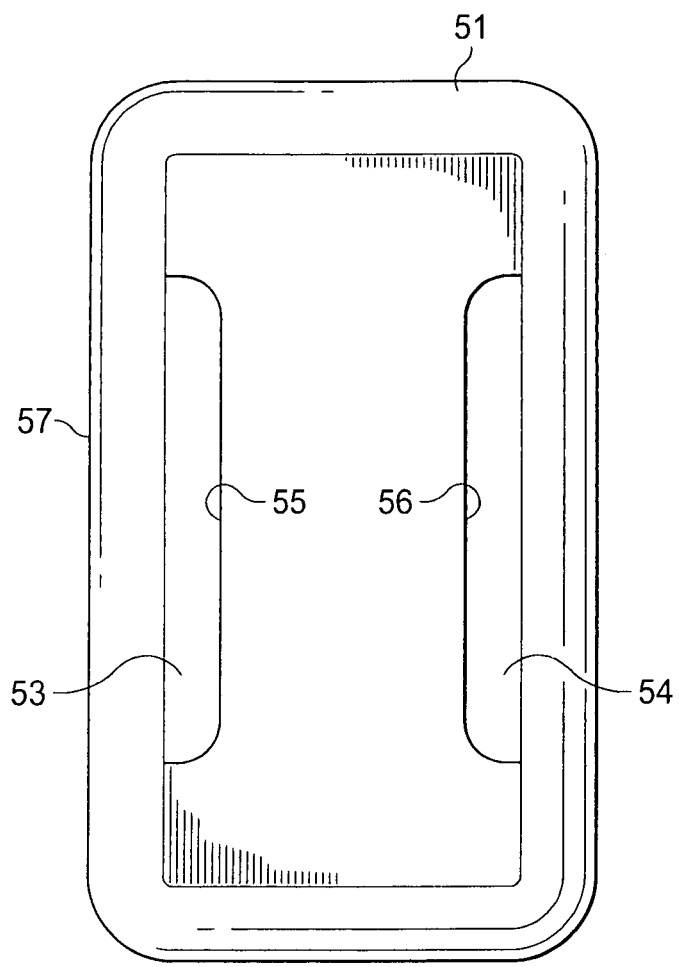
FIG. 5 shows a third embodiment of the invention.
Figure 6:
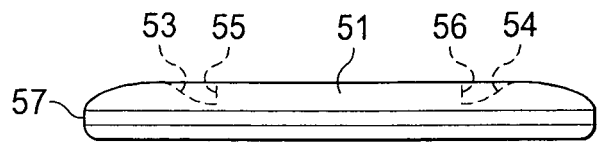
FIG. 6 shows an end view of FIG. 5.

FIG. 5 shows a third preferred embodiment of this invention. FIG. 5 shows the back side of a mobile device 51 that has two elongated hollows or recessed portions 53 and 54 in back surface of the mobile device's housing or protective cover. FIG. 6 shows an end view of FIG. 5. In FIG. 6, one can see that there are two opposing grip surfaces 55 and 56, one in each elongated hollow or recessed portion in the back of the mobile device. The two opposing grip surfaces 55 and 56 face in opposite directions and are each generally perpendicular to the width and length of the device 51, although they could be somewhat angled from the perpendicular. The width and length of the grip surfaces 55 and 56, and the size and shape of the hollows or recessed portions 53 and 54, is a matter of design choice. The distance between the two grip surfaces 55 and 56 is also a matter of design choice.

The person using the mobile device 51 can grasp the device by gripping and holding the two opposing grip surfaces 55 and 56. Alternatively, a person can cradle a first edge 57 of the mobile device in the crevice of the hand's palm between the thenar and the hypothenar, and insert one or more fingers in the elongated recessed portion 54 opposite the first edge of the mobile device to grip the grip surface 56 in that recessed portion. A person of ordinary skill in this art will be able to devise other obvious ways of using the embodiment shown in FIGS. 5 and 6.

Although FIGS. 5 and 6 show the grip surfaces 55 and 56 totally recessed into the body of the mobile device, the grip surfaces could be disposed such that they are partly recessed and partly protruding from the back of the mobile device. One of ordinary skill in this art who reads this disclosure will be able to conceive of various ways to arrange the gripping surfaces which are obvious modifications of this disclosure.

Figure 7:
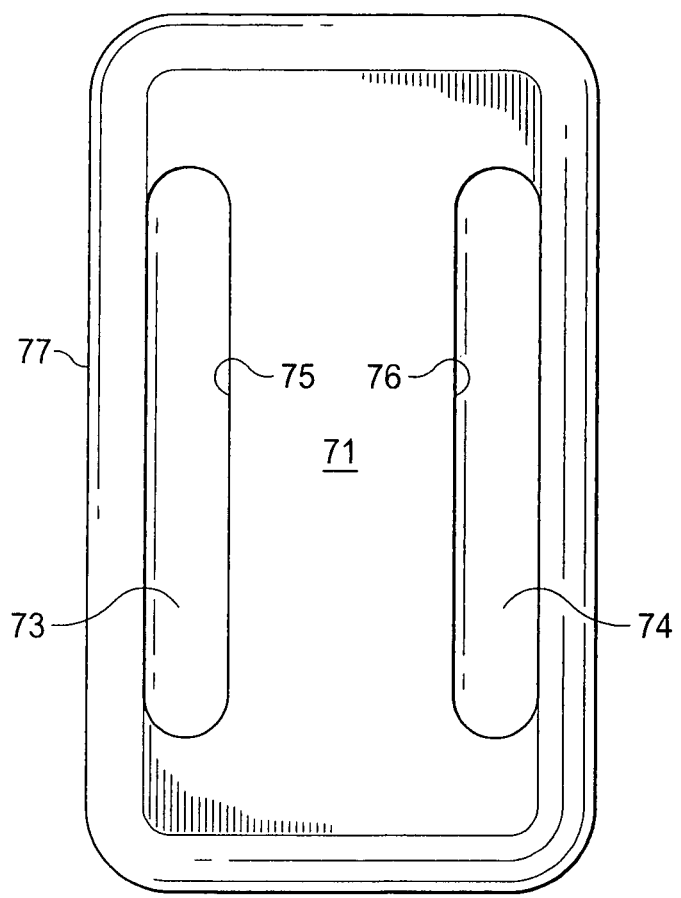
FIG. 7 shows a fourth embodiment of the invention.
Figure 8:
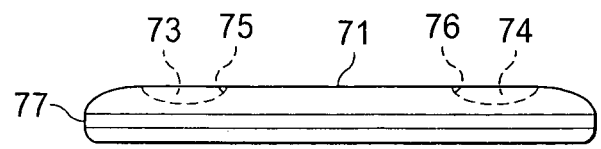
FIG. 8 shows an end view of FIG. 7.

FIGS. 7 and 8 show an embodiment that is similar to that of FIGS. 5 and 6. In the embodiment shown in FIG. 7, there are two slots or cavities 73 and 74 in the body or housing of the mobile device 71 on its back. The exact shape, depth, and location of the slots or cavities 73 or 74 are a matter of design choice. Each of the slots or cavities 73 and 74 has at least one grip surface 75 and 76 that is a wall of the slot or cavity wherein the wall is approximately perpendicular to the back surface of the mobile device 71. As one of ordinary skill in this art will readily see, a person could grasp and hold the mobile device by inserting a thumb in one slot or cavity, and one or more fingers into the other slot or cavity shown in FIG. 7. Depending on how the person holds the mobile device, the weight of the mobile device might cause it to rest on the thumb or fingers more toward the top or bottom of the slots or cavities in the mobile device. Alternatively, a person can cradle a first edge 77 of the mobile device 71 in the crevice of the hand's palm between the thenar and the hypothenar, and insert one or more fingers in the slot 73 opposite the first edge of the mobile device, gripping that slot's grip surface 75. If done in this manner, the person could use either the left or the right hand. The outer edges of both slots can be used for carrying the device. A person of ordinary skill in this art will be able to devise other obvious ways of using the embodiment shown in FIG. 7.

Figure 9:
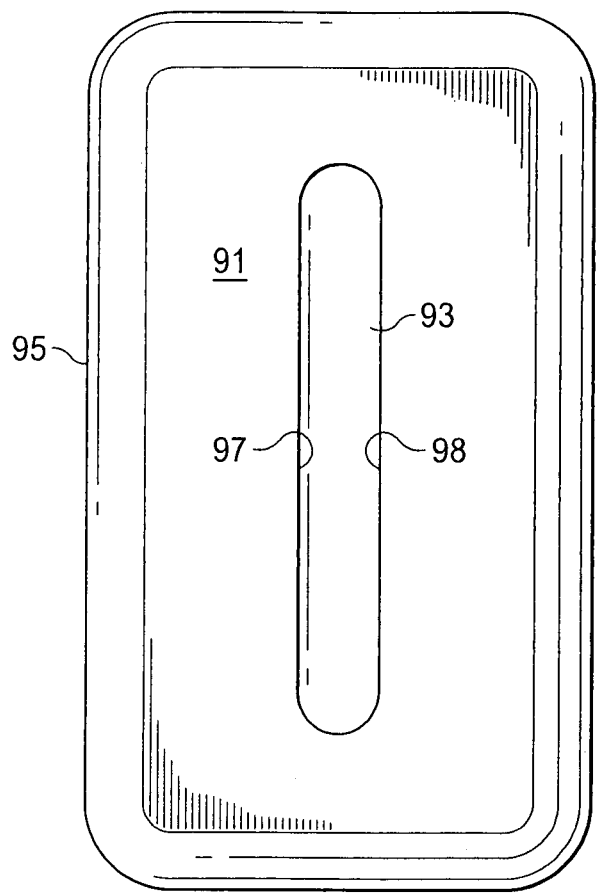
FIG. 9 shows a fifth embodiment of the invention.
Figure 10:
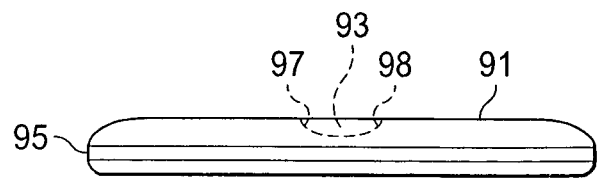
FIG. 10 shows an end view of FIG. 9.

FIGS. 9 and 10 show another embodiment that might be practical for mobile devices of a particular width. It may be possible to provide only one slot or cavity 93 in the back of the body or housing of the mobile device 91. The slot or cavity 93 can have one or two grip surfaces 97 and 98 which are the walls of the slot or cavity 93. The person could then, with either hand, place one edge of the mobile device against the palm of the hand (or the thumb) and insert one or more fingers into the single slot or cavity 93, and thereby grasp and hold the mobile device with one hand. Alternatively, but less likely, a person could place a thumb of one hand within the slot or cavity 93, and place the fingers of that hand around an edge 95 of the mobile device. For some widths of mobile devices, this embodiment will not be practical, as is plainly apparent. The width, depth, and length of the slot 93 would be a design choice that can be made by a person of ordinary skill in this art who has learned of this invention.

For the embodiment of FIG. 7, the elongated side walls of each of the two slots or cavities form gripping surfaces for gripping or holding the device, either when using it or when carrying it. For the embodiment of FIG. 9, the elongated side walls of the slot or cavity form gripping surfaces. In particular, the walls of the slot or cavity may be shaped to be approximately perpendicular to the back surface of the mobile device so that they can be gripped securely by a person's finger(s). The walls may be textured or roughened to increase purchase by the finger(s). It may also be desirable to extend the back surface of the mobile device outwards slightly around the cavity or cavities to provide extra surface for gripping. This outward extension of the gripping surfaces would slope back to the normal flat surface of the back of the mobile device.

Figure 11:
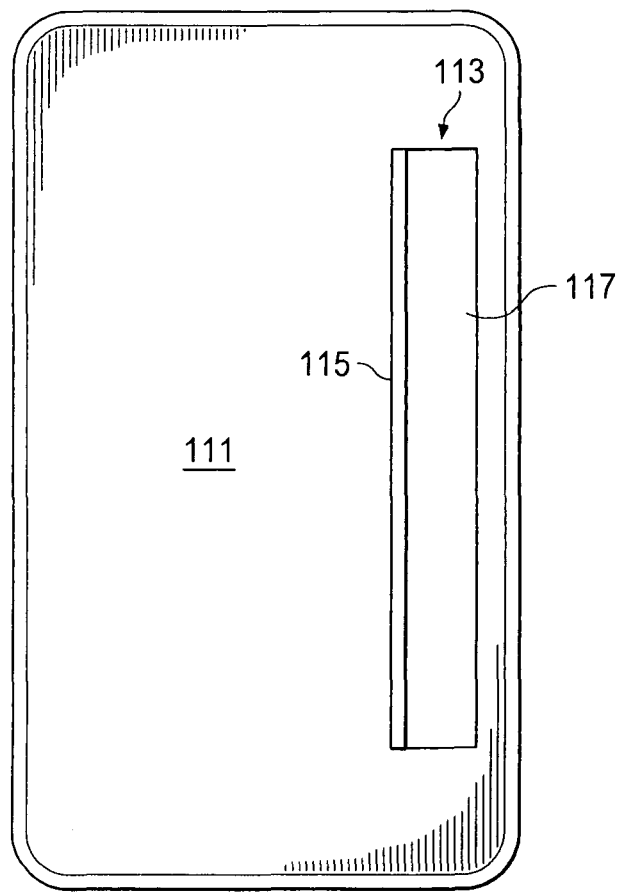
FIG. 11 shows a sixth embodiment of the invention.
Figure 12:
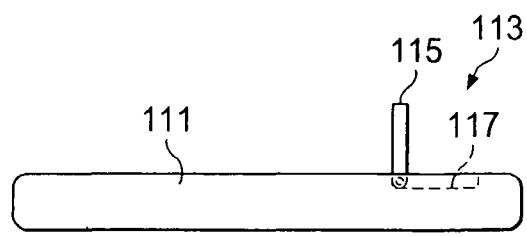
FIG. 12 shows an end view of FIG. 11.

FIGS. 11 and 12 show another embodiment having a retractable gripping handle. FIG. 12 is an end view showing the bottom end of a mobile device 111 and a retractable gripping handle 113 mounted on the back large surface of the mobile device 111. The gripping handle 113 can simply be a flat planar gripping body 115, or a body that conforms to whatever curve the mobile device body might have at that location. One edge of the gripping body 115 is pivotally attached to the body of the mobile device 111 and there is a recessed portion 117 in the body of the mobile device 111 into which the gripping body 115 can lie such that it is flush with the body of the mobile device 111.

In use, a person can use a finger to lift the gripping body up to a position roughly perpendicular to the plane of the body of the mobile device at that location. There may be some sort of indentation that allows the person to insert a finger or fingernail under the gripping body to raise it. It may or may not be spring-biased such that it normally lies closed or flush with the mobile device in the recessed portion. When pulled open, the farthest angle of travel may be approximately 90-degrees (that is, perpendicular to the plane of the body of the mobile device) or some other appropriate angle that enables the user to conveniently hold and manipulate the mobile device.

There could be one or more gripping handles disposed on a mobile device. The exact location of the retractable gripping handle(s) on the back of the mobile device, and the width, thickness, and length of the gripping body(s) are all matters of design choice. A person of ordinary skill in this art, after learning of this invention, will be able to choose those to suit the particular mobile device and needs of the user.

Figure 13:
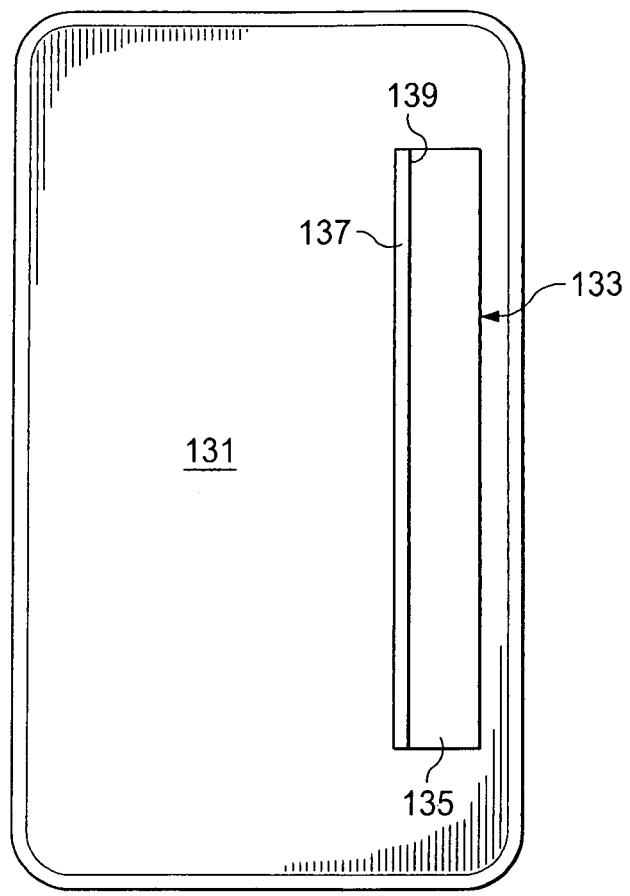
FIG. 13 shows a seventh embodiment of the invention.
Figure 14:
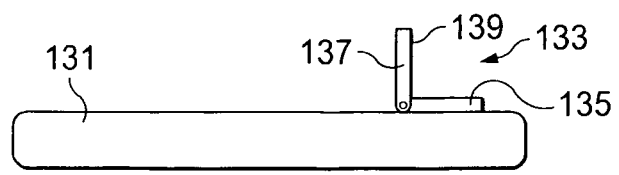
FIG. 14 shows an end view of FIG. 13.

FIGS. 13 and 14 show another embodiment having a retractable gripping handle. FIG. 14 is an end view showing the bottom end of a mobile device 131 and a retractable gripping handle 133 mounted on the back surface of the mobile device 131. The gripping handle has an attachment body 135 that is secured to the back surface of the mobile device 131 (or its cover). The attachment body 135 is also pivotally attached to a gripping body 137 that has a grip surface 139. The gripping body 137 can be moved such that it is adjacent and parallel to the attachment body, or it can be moved such that it stays at a 90-degree angle to the attachment body, as is shown. The pivot may be spring-loaded such that the gripping body 137 normally stays adjacent and parallel to the attachment body, being moved perpendicular only by mild force, as when a finger grips it to hold the mobile device 131, or it may not be spring-loaded.

There could be one or more retractable gripping handles disposed on a mobile device. The exact location of the retractable gripping handle(s) on the back of the mobile device, the width, thickness, and length of the gripping handle(s), and the size of the attachment body(s) are all matters of design choice. A person of ordinary skill in this art, after learning of this invention, will be able to choose those to suit the particular mobile device and needs of the user.

Figure 15:
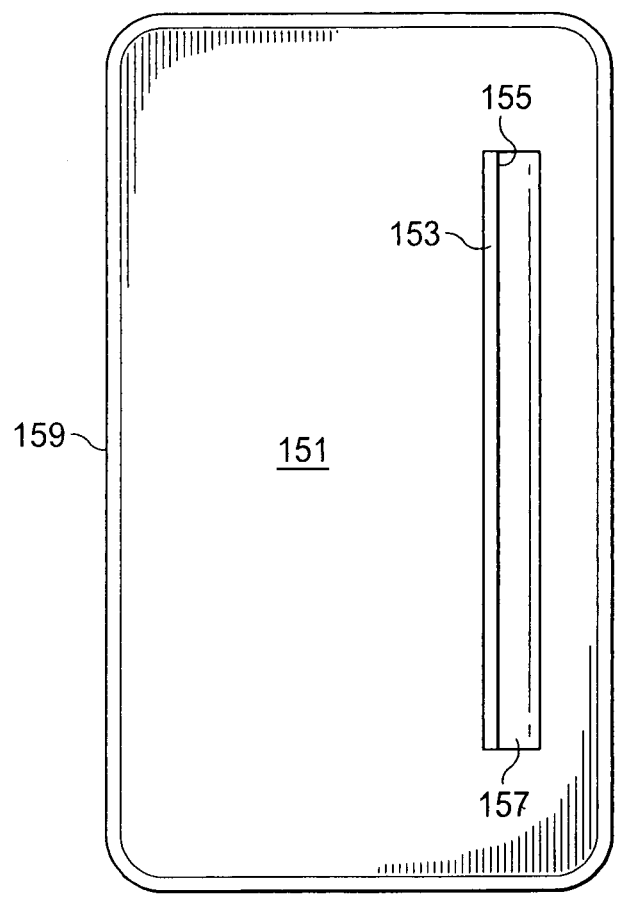
FIG. 15 shows an eighth embodiment of the invention.
Figure 16:
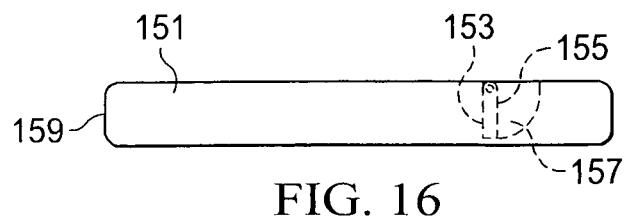
FIG. 16 shows an end view of FIG. 15.

FIGS. 15 and 16 show another embodiment of this invention. FIG. 16 is an end view that shows a gripping body 153 having a grip surface 155. In this embodiment, there is an appropriately-sized cavity 157 within the body of the mobile device 151. The gripping body 153 is pivotally mounted at one end of the cavity 157. The gripping body 153 is normally mounted such that it lies roughly parallel to the outer surface of the body of the mobile device 151 at that location, thereby creating a "flush" appearance. However, when pressed by a finger or other object, the gripping body 153 can swing roughly 90-degrees on its pivot down into the cavity 157 within the mobile device, coming to a stop against one wall of the cavity. In this position, the user's finger will be able to find purchase against the grip surface 155 of the gripping body 153. The gripping body 153 may be spring-biased so that it normally lies roughly flush with the back of the mobile device 151. There may be one or two (or more) of such cavities with pivoting gripping bodies. The user may insert a thumb into one cavity, and one or more fingers into a second cavity. Alternatively, the user could cradle one edge 159 of the mobile device against the palm of the hand, and insert one or more fingers into the cavity with the gripping body. The size of the gripping body, the size and shape of the cavity, and the location of the cavity and gripping body on the back of the mobile device are all matters of design choice.

Figure 17:
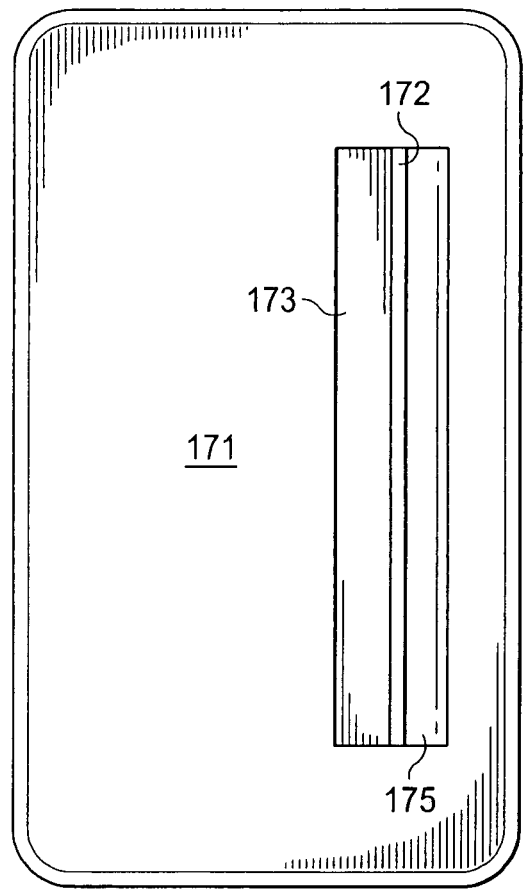
FIG. 17 shows a ninth embodiment of the invention.
Figure 18:
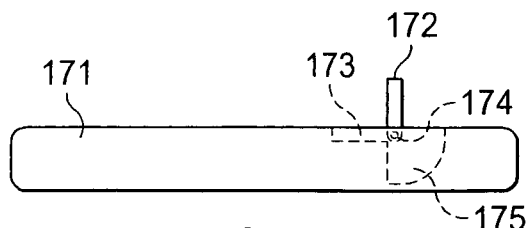
FIG. 18 shows an end view of FIG. 17.

FIGS. 17 and 18 show another embodiment of this invention. FIG. 18 is an end view that shows another embodiment of this invention wherein there is a gripping body 172 that is a single planar body that is pivotally mounted as shown flush with or just below the surface of the back of the mobile device 171. There is a slight recessed portion 173 in the body of the mobile device just to the left of the pivot 174 in the drawing, and there is a cavity 175 to the right of the pivot 174. The cavity 175 to the right of the pivot 174 is sized and shaped to accommodate half of the gripping body 172 swinging downwards into the body of the mobile device 171. When the gripping body 172 is not in use, it will normally lie flush along the back surface of the body of the mobile device 171, providing a smooth closed appearance. The gripping body 172 may be spring-biased in this closed position. When a person presses on the gripping body to the right of the pivot with a finger, the gripping body will rotate (clock-wise in the drawing) such that it is positioned as shown in the drawing (that is, perpendicular to the back surface of the mobile device). In this open position, half of the gripping body 172 is disposed above the back surface and perpendicular to it, and the other half of the gripping body 172 is disposed within the cavity 175 and pressing against a wall of the cavity 175 as shown. The person can then use the grip surface on the gripping body to hold the mobile device in a manner similar to that shown in FIG. 2. The size of the gripping body is a matter of design choice. The cavity will usually be sized and shaped to accommodate the gripping body. The location of the gripping body and the cavity on the back of the mobile device is a matter of design choice. While FIG. 18 shows the pivot mounted midway along the gripping body, it is possible to mount the pivot 174 at a different point along the gripping body 172, such that the gripping body is asymmetrical with respect to the pivot. In such a case, the sizes of the recessed portion 173 and the cavity 175 would be adjusted to fit the particular size of the gripping body 172 on each side of the pivot.

Figure 19:
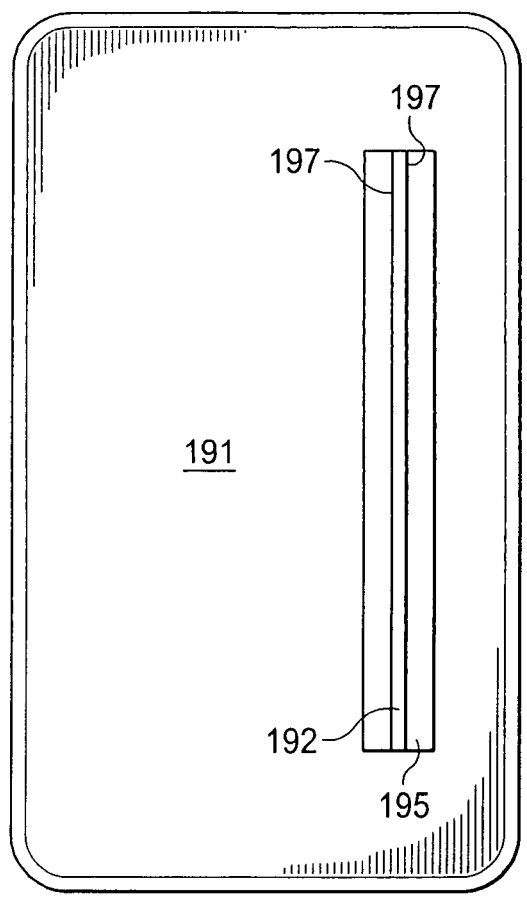
FIG. 19 shows a tenth embodiment of the invention.
Figure 20:
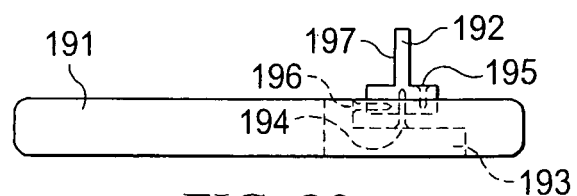
FIG. 20 shows an end view of FIG. 19.

FIGS. 19 and 20 show another embodiment of this invention. FIG. 20 is an end view that shows a grip body 192 as shown that is screwed onto the body of the mobile device 191 with one or more screws. The body of the mobile device is provided with an appropriately sized and shaped hole 193 through the mobile device. The screw 194 or 196 can then be started from a point in the hole and screwed into the grip body, or the screw 195 can be started from a point on the grip body and screwed into the body of the mobile device (at a position where its entry into the mobile device does not affect the operation of the mobile device). The cavity or hole 193 shown in the figure would probably not be the actual shape one would provide. It is used for illustrative purposes only. One of ordinary skill in this art, having read this disclosure, will be able to conceive of an obvious way to configure the hole to attach the grip body to the mobile device with one or more screws. The grip body 192 is at least somewhat elongated as shown in FIG. 19 and has one or two gripping surfaces 197 along its elongated dimension. There can be one or two (or more) such grip bodies attached to the mobile device. There are three possible screw positions shown in FIG. 12. Further, instead of screws, another attachment means could be substituted from screws, such as nails, tacks, rivets, rods, or the like.

Figure 21:
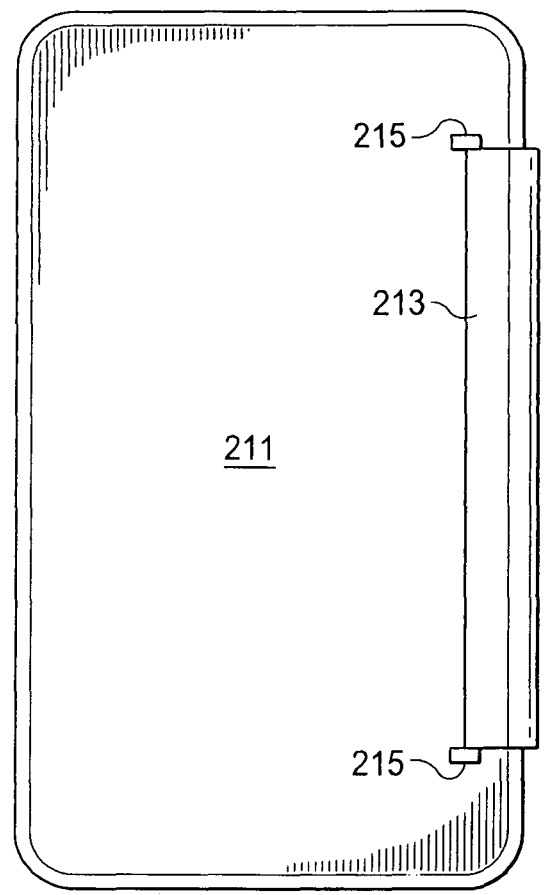
FIG. 21 shows an eleventh embodiment of the invention.
Figure 22:
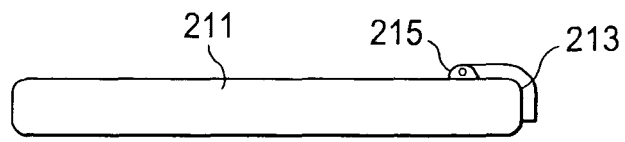
FIG. 22 shows an end view of FIG. 21.

FIGS. 21 and 22 show another embodiment of this invention. FIG. 22 is an end view that shows another embodiment of this invention wherein there is provided at least one angled grip body 213 disposed at an edge of the mobile device 211. In the drawing of FIG. 22, the front surface and display screen of the mobile device 211 is on the bottom of the drawing. The angled grip body is pivotally mounted slightly above one side of the back surface of the mobile device 211. This type of mounting would typically be done after the manufacture of the mobile device 211 as an "add-on". The gripping body 213 is elongated and can be shaped like an "angle iron" with a shape in cross-section approximating an "L". A pivot holder 215 is attached to the back surface of the mobile device near the edge, and the angled grip body 213 is pivotally attached along one edge to the pivot holder 215 as shown in the drawing. The angled grip body 213 is shown in its closed position in the drawings, but it can rotate (counterclockwise in FIG. 22) from the closed position to an open position. In the open position, the angled grip body 213 will extend to the left of the pivot holder along the mobile device 211 and also upwards. When in the open position, the angled grip body 213 will be positioned similar to that shown in FIG. 24. The upwards projection of the angled grip body will provide a gripping surface that a user can grasp with a thumb or with one or more fingers. The angled grip body 213 would typically be shaped to fit snugly around the back and edge of the mobile device 211.

Figure 23:
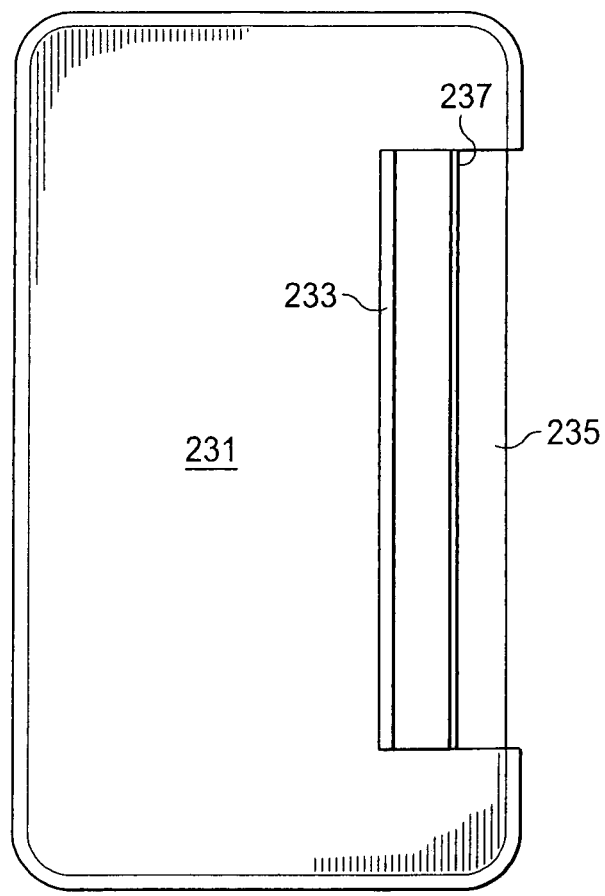
FIG. 23 shows a twelfth embodiment of the invention.
Figure 24:
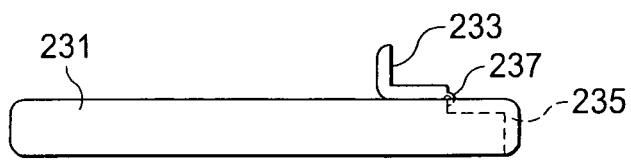
FIG. 24 shows an end view of FIG. 23.

FIGS. 23 and 24 show another embodiment of this invention. FIG. 24 is an end view that shows an angled grip body 233 disposed at an edge of the mobile device 231. In the drawing of FIG. 24, the front surface and display screen of the mobile device 231 is on the bottom of the drawing. The angled grip body 233 is pivotally mounted slightly within one side of the back surface of the mobile device 231 on any suitable pivot means 237. This type of mounting would typically be accomplished during manufacture of the mobile device 231. The angled grip body 233 is elongated and can be shaped like an "angle iron" with a shape in cross-section approximating an "L". There is also a slight recess 235 in the back surface of the mobile device 231 along a portion of the back and one side. This recessed portion 235 is sized and located to receive the angled grip body 233 when it moves to the closed position. The angled grip body 233 is shown in its open position in the drawings, but it can rotate (clockwise in FIG. 24) from the open position to a closed position. The angled grip body is pivotally attached to the mobile device 231 on the back surface of the mobile device as shown in the drawing such that, when the gripping body is rotated clockwise, the gripping body will be seated in the recessed portion. The upwards projection of the angled grip body in the open position will provide a gripping surface that a user can grasp with a thumb or with one or more fingers. The angled grip body 233 would typically be shaped to fit snugly around the back and edge of the mobile device 231. The angled grip body 233 can be spring-biased to the closed position.

A mobile device made or modified according to the embodiment shown in FIGS. 21 to 24 might have one or more angled grip body(s), either of the type shown in FIG. 22 or FIG. 24. A person using a mobile device according to the embodiment disclosed in either FIG. 22 or FIG. 24 would typically open the angled grip body and then hold the mobile device's edge cradled in the crevice between the palm's thenar and the hypothenar, and would grasp the grip surface of the angled grip body with one or more fingertips. Any angled grip body can be biased, possibly with a spring, to stay in the closed position until opened by a user. After use, the biasing mechanism can move the angled grip body back into the closed position. Such biasing mechanisms are well-known in this art. Alternatively, a user could grasp the grip body with the thumb and hold the opposite edge of the mobile device with the fingers.

Figure 25:
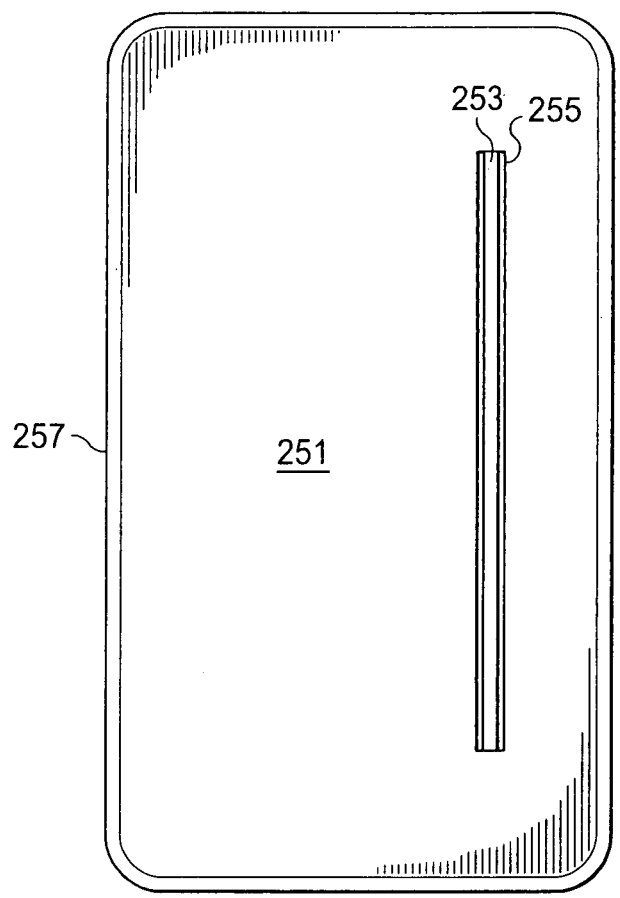
FIG. 25 shows a thirteenth embodiment of the invention.
Figure 26:
FIG. 26 shows an end view of FIG. 25.

FIGS. 25 and 26 show another embodiment of this invention. FIG. 26 is an end view that shows another embodiment of this invention wherein a mobile device 251 has a grip body 253 that can extend out of and into the body of the mobile device 251. There is a holding member 255 placed within the body of the mobile device. There is also provided a grip body 253. The holding member 255 includes an open well into which the grip body 253 can be lowered, and a mechanism (not shown) which holds the grip body 253 in one of two positions. One of the two positions is a raised position wherein the grip body 253 extends out of the holding member 255 and extends some distance above the back surface of the mobile device 251. In this open position, the grip body 253 is still securely attached to the holding member 255 and thereby the mobile device 251. The second of the two positions is a lowered position wherein the grip body 253 is almost fully lowered and held within the well of the holding member 255. The mechanism which holds the grip body 253 in one of two positions will securely hold the grip body 253 in a particular position until pressure is applied downwardly on the top end of the grip body 253. The mechanism which holds the grip body 253 is functionally the same as a "click-pen" mechanism that raises or lowers a ball-point pen out of or into its pen housing. Such mechanisms are well-known in this art and it would be within the skill of a person of ordinary skill in this art to provide such a mechanism for this embodiment. In use, the grip body 253 would normally reside in the lowered position. If a person wanted to use it, the person would press down on the top of the grip body 253 (which will still be slightly raised to allow "clicking" it) causing the grip body 253 to be pushed upwards out of the well (by a spring within the holding member) into the raised position. The person could then use the grip body 253 in conjunction with an edge 257 of the mobile device 251 to hold and manipulate the mobile device 251. The grip body 253 may be sized to be fairly small or it could be somewhat elongated. The size and shape of the grip body 253 in this embodiment is a matter of design choice. Whatever size and shape the grip body 253 is chosen to take, the holding member 255 and the well will be designed to accommodate that size and shape.

Figure 27:
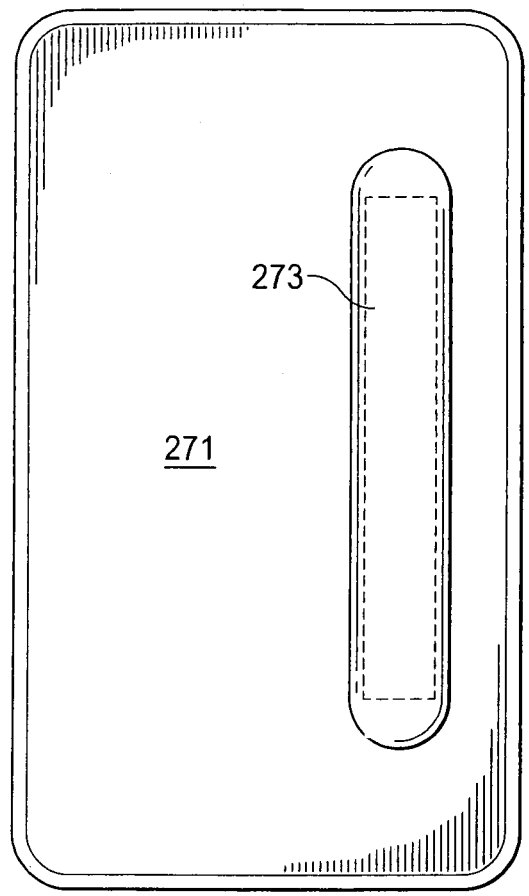
FIG. 27 shows a fourteenth embodiment of the invention.
Figure 28:
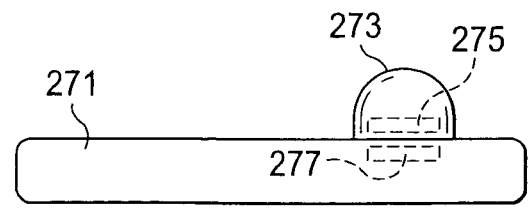
FIG. 28 shows an end view of FIG. 27.

FIGS. 27 and 28 show another embodiment of this invention. FIG. 28 is an end view that shows another embodiment of this invention wherein a grip body 273 is placed on a mobile device 271 and attaches by a magnet. The magnet chosen must be sufficiently strong that the grip body 273 is held in place in normal use. One way to attach the grip body 273 to the back surface of the mobile device 271 is to provide a magnet 275 in the lower part of the grip body 273 and then place the grip body 273 on the back surface of the mobile device or its protective cover. If the mobile device's back side or its cover is not made of a material to which a magnet will easily stick, then a magnetically-attractive plate 277 can be attached to the surface, or just under the surface, of the back of the mobile device 271 or its protective cover. Alternatively, the grip body 273 can be provided with a metal plate (but no magnet) and a magnet can be attached magnetically to the back of the mobile device 271 or its protective cover. When the grip body 273 is placed on the magnet, it will stick to it. Alternatively, a first magnet can be disposed on or within the grip body 273, preferably near the surface which will be mounted on the mobile device. The first magnet will be arranged so that a first polarity (either N or S) will be disposed at the mounting surface. A second magnet can be disposed on or just under the location on the back of the mobile device 271 where the grip body 273 is to be attached magnetically. The second magnet will be arranged so that a second polarity (either S or N) will be disposed toward the mounting surface. Then, when the two magnets are brought near one another, they will attract each other and the grip body 273 will be magnetically held to the proper location on the back of the mobile device 271. The grip body 273 can then be used in conjunction with the edge of the mobile device 271 to allow a person to hold and manipulate the mobile device as discussed above. The grip body 273 can also be a writing or designating instrument or a stylus or any other useful instrument in addition to serving as a grip body. The grip body 273 could also be hollow or semi-hollow, and the hollow space could be used to store something.

Figure 29:
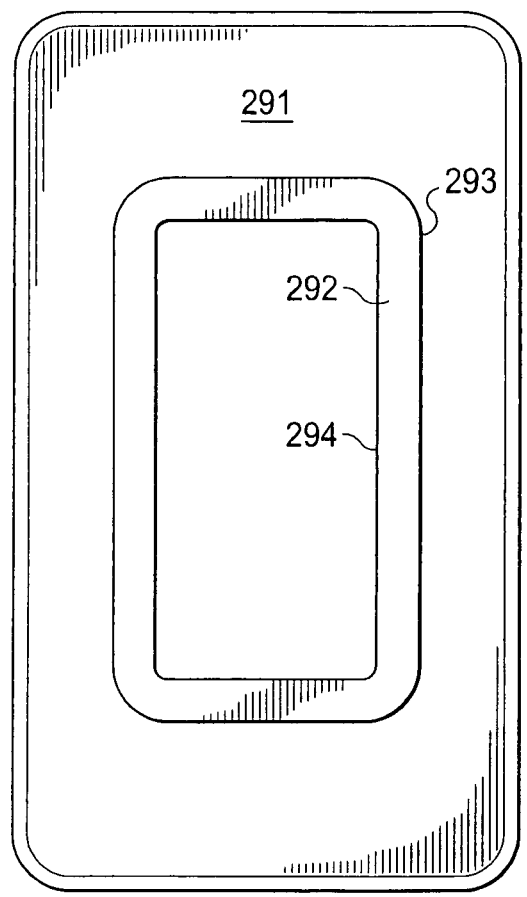
FIG. 29 shows a fifteenth embodiment of the invention.
Figure 30:
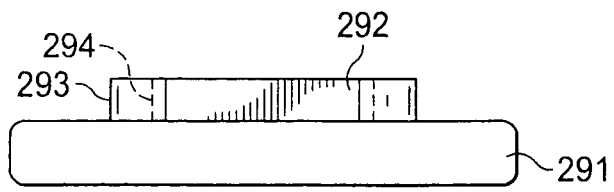
FIG. 30 shows an end view of FIG. 29.

FIGS. 29 and 30 show another embodiment of this invention. FIG. 29 shows the back of a mobile device 291 that has a rectangular element 292 integrally formed with the back of the mobile device 291 or attached to it. The rectangular element has four outer sides 293 and four inner sides 294. Each of the four outer sides 293 and each of the four inner sides 294 can be used as a grip surface in a manner similar to that described above for FIG. 1. FIG. 30 is an end view of FIG. 29 and shows how the rectangular element 292 is associated with the back of the mobile device 291. The rectangular element 292 could, of course, be a square element. Alternatively, instead of a rectangular element as shown, the gripping surfaces could be indentations or recesses or cavities molded into the back of the mobile device, or its casing.

Figure 31:
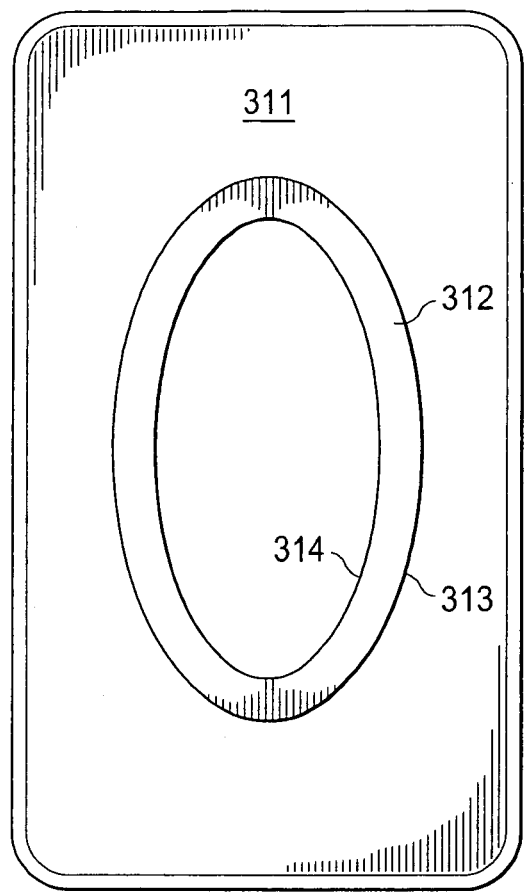
FIG. 31 shows a sixteenth embodiment of the invention.
Figure 32:
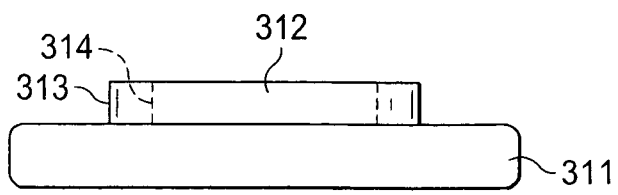
FIG. 32 shows an end view of FIG. 31.

FIGS. 31 and 32 show another embodiment of this invention. FIG. 31 shows the back of a mobile device 311 that has an ovular element 312 integrally formed with the back of the mobile device 311 or attached to it. The ovular element 312 has an ovular outer side 313 and an ovular inner side 314. Either the outer side 313 or the inner side 314 or both sides of the ovular element 312 can be used as a grip surface in a manner similar to that described above for FIG. 1. FIG. 32 is an end view of FIG. 31 and shows how the ovular element 312 is associated with the back of the mobile device 311. The ovular element 312 could, of course, be a circular element. Alternatively, instead of an ovular element as shown, the gripping surfaces could be indentations or recesses or cavities molded into the back of the mobile device, or its casing.

Figure 33:
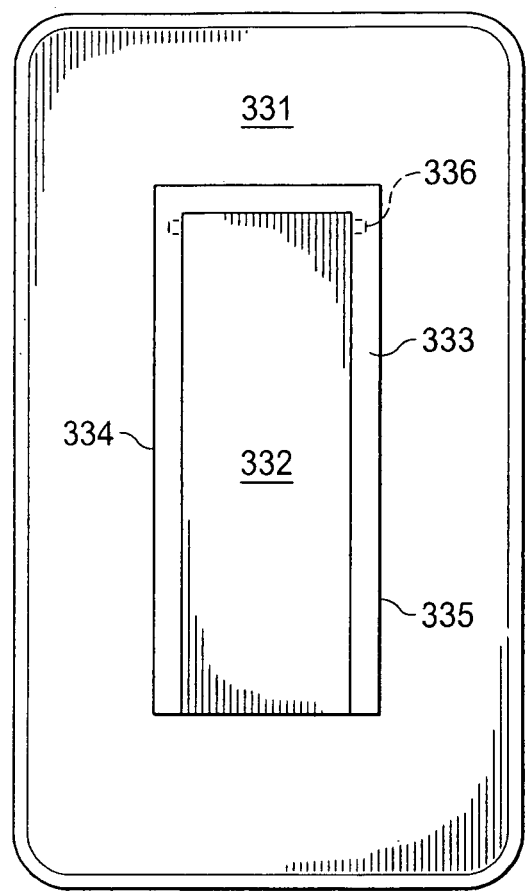
FIG. 33 shows a seventeenth embodiment of the invention.
Figure 34:
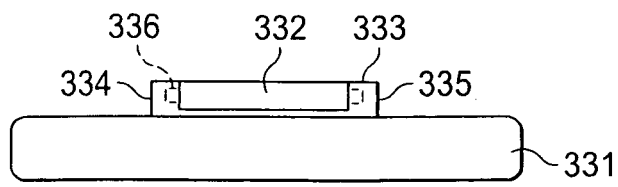
FIG. 34 shows an end view of FIG. 33.

FIG. 33 shows another embodiment of this invention. Mobile devices sometimes are provided with a clip or stand such that the device can be clipped to another object, or the device can be stood up on a surface in the manner of a picture frame with a pivoting stand on the back of the device. It is possible to use the edges of the clip or the stand, or the mount that holds them, as a gripping surface in order for a person to conveniently and securely hold the mobile device in the person's hand. In this situation, the stand would not be in a deployed position but would be in a closed position adjacent the back surface of the mobile device. In FIG. 33, there is shown a stand or clip 332 that is pivotally attached to a mount 333 by a simple pivot mechanism 336. The mount 333 is attached to or integrally formed with the back surface of the mobile device 331. The mount 333 in this embodiment is shaped such that the clip or stand 332 moves on its pivot completely within the mount 333 when the clip or stand 332 is in the closed position. The side edges 334 and 335 of the mount are approximately perpendicular to the back surface of the mobile device 331. As such, they provide good grip surfaces for a person's hand. FIG. 34 shows an end view of the device shown in FIG. 33, and one can see how the clip or stand 332 fits snugly into the mount 333. Depending on which hand the person uses, the person may snug the edge of the mobile device into the person's thenar and place the tips of the hand's fingers on the grip surface opposite the edge located in the thenar. This means of grasping the device will enable the person to hold the device in a convenient and secure manner with either hand. The stand or clip may be spring-biased to the closed position, or it may not have any biasing. The stand or clip could snap-fit into the mount. If the mount holds a clip, then the clip may not move far from the mount, but just enough to clip onto a thin article, such as a pocket.

Figure 35:
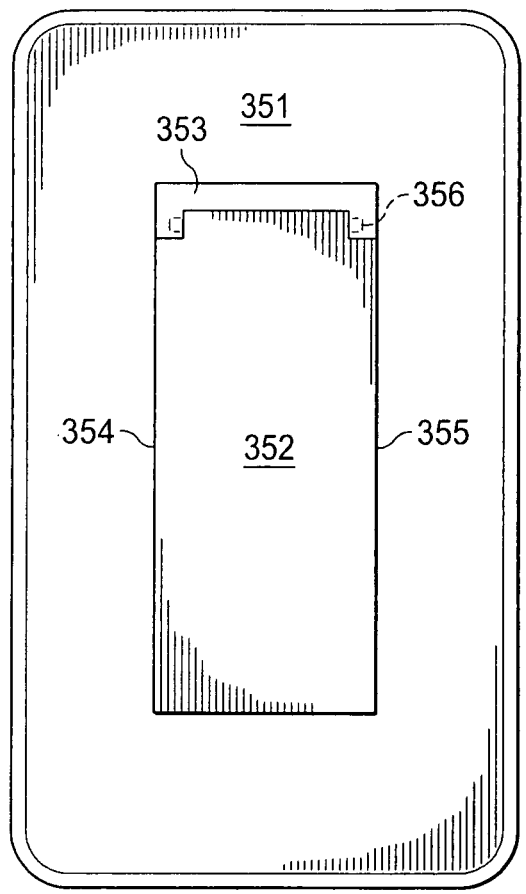
FIG. 35 shows an eighteenth embodiment of the invention.
Figure 36:
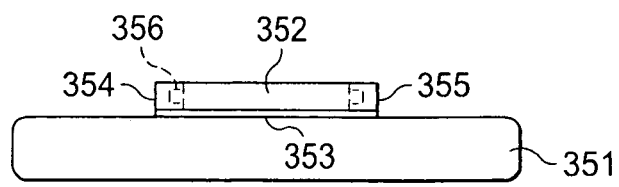
FIG. 36 shows an end view of FIG. 35.

FIG. 35 shows another embodiment similar to FIG. 33, but wherein the stand or clip 352 does not fit into the mount 353. In FIG. 35, the mount 353 is smaller. The mount 353 is attached to or integrally formed with the back of the mobile device 351. Pivotally connected to the mount 353 by a pivot means 356 is a stand or clip 352. The stand or clip 352 pivots between an open position and a closed position. The sides 354 and 355 of the stand or clip 352 are approximately perpendicular to the back of the mobile device. As such, the sides 354 and 355 of the stand or clip 352 provide a good grip surface that can be used by a person to hold the mobile device 351 similar to that described above for the embodiment of FIG. 33. FIG. 36 shows an end view of the device shown in FIG. 35.

Figure 37:
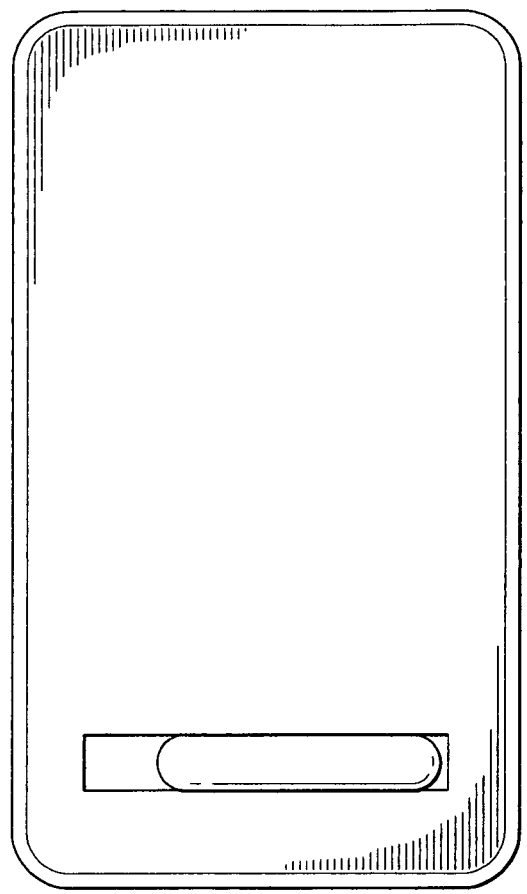
FIG. 37 shows a nineteenth embodiment of the invention in the deployed position.
Figure 38:
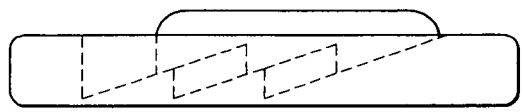
FIG. 38 shows a side view of FIG. 37.
Figure 39:
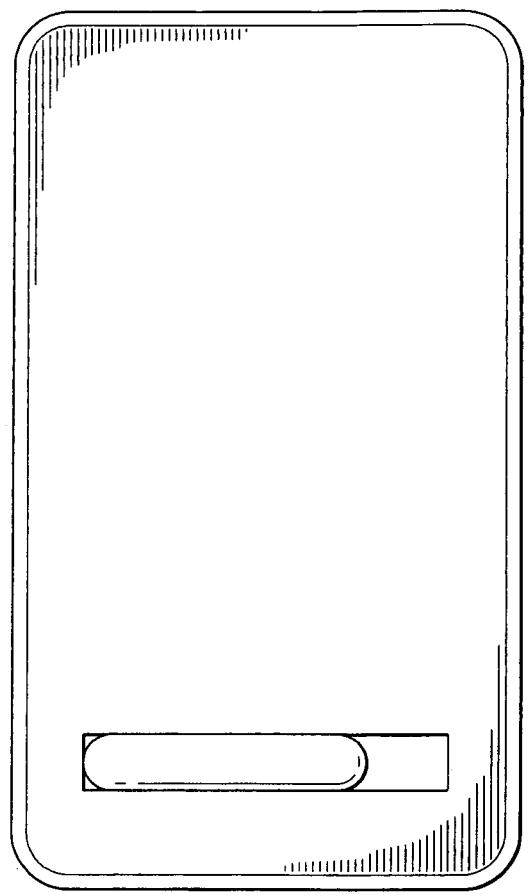
FIG. 39 shows the nineteenth embodiment in the stored position.
Figure 40:
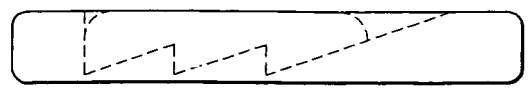
FIG. 40 shows a side view of FIG. 39.

FIG. 37 is a back view of a mobile device that shows another embodiment of this invention wherein a grip body 373 is provided that can be moved between a deployed position and a stored position. The grip body 373 is shown in its deployed position in FIG. 37. FIG. 38 is also a side view that shows the grip body 373 in its deployed position. There is a recessed portion 375 in the back surface of the mobile device 371 as shown in the figures. The recessed portion 375 has a major surface 377 that is zig-zagged as shown in FIGS. 37 and 38. The bottom part 379 of the grip body 373 has also has a zig-zagged surface as shown that complements the major surface 377 of the recessed portion 375. When the grip body 373 is moved up (to the top in the drawings), it is forced up into the deployed position by the bottom surface 377 of the recessed portion 375. FIG. 39 shows the back of the mobile device with the grip body 373 in the closed or lowered position. This is also shown in FIG. 40 which is a side view from the right side of the mobile device looking to the left. When the grip body 373 is moved down (to the bottom in the drawings), it also moves downward and is seated in the recessed portion 375, as shown in FIG. 38, with the top surface of the grip body 373 then lying generally flush with the back surface of the mobile device 371. While in the deployed position, a person can use the grip body and the edge of the mobile device to hold and manipulate the mobile device in the manner discussed above.

The grip body 373 shown in FIGS. 37 to 40 can slide back and forth between its stored position and its deployed position by any suitable means. One such means would have a post extending from each end of the grip body and a slot in the device body on each end of the recessed portion, such that the first post is inserted in the first slot, and the second post is inserted in the second slot. The post and slot combination would then guide the grip body back and forth between positions. Persons of ordinary skill in this art will be able to devise other suitable means of enabling the grip body 373 to slide back and forth between positions.

It should be noted that all grip bodies shown in all embodiments discussed above can be built into or attached to a protective case or a protective enclosure that will partially surround the mobile device. It is clearly necessary for the grip body or bodies to be disposed on the outside of the mobile device, or whatever might cover it, for a person to be able to use the grip body or bodies to hold and manipulate the mobile device.

It may be desirable to provide a roughened or textured surface for any or all of the gripping surfaces. Since fingers and thumbs can be slippery, providing roughened or textured surfaces on any gripping surface described in this disclosure may enable the person to hold the mobile device more securely or conveniently.

The various pivot means described above can utilize any known suitable pivot means. For example, a piano hinge could be used, or a simple rod extending through a body and into slots in the mobile device, or a post and slot combination as described above could be utilized. Persons of ordinary skill in this art, having learned of the invention, will be able to devise suitable pivoting means for the embodiments that have a pivoting part.

In any of the embodiments shown in FIG. 19, 25, 37, 39, 44, or 46, the grips could click or snap into their open and closed positions by the use of a magnet clamp, or by the use of a snap closure that utilizes a small protrusion that goes into or past a dimple, slot, or second protrusion, or any other suitable means of holding the grips open or closed.

Some mobile devices, such as tablet computers, can be used with a stylus. My invention includes different means for either storing a stylus in a grip handle, or in actually using the stylus to form part of the grip handle.

Figure 41:
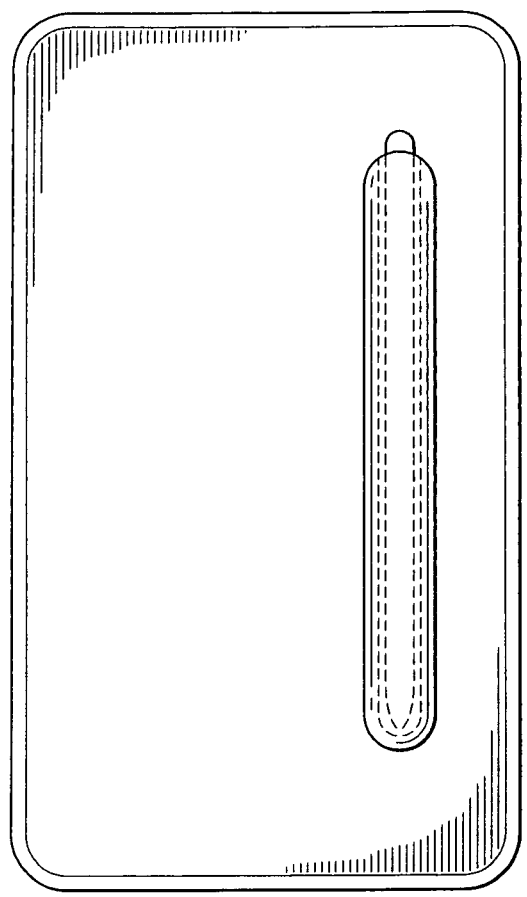
FIG. 41 shows a twentieth embodiment of the invention.

FIG. 41 shows one preferred embodiment of this invention. In this figure, an elongated grip handle 413 is disposed on the back side of a mobile device 391. The elongated grip handle 413 can be made and mounted such that there is a cavity 415 within the grip handle 413 including at least one opening into which an elongated stylus 417 can be inserted. One exterior elongated side 419 of the grip handle 413 can be somewhat flattened (and perhaps roughened) to serve as a grip surface. There may be a small opening (not shown in the drawing) at the bottom of the elongated grip handle to allow drainage of any fluid that might enter the cavity and to allow air to flow into and out of the cavity 415. The cavity 415 in the grip handle 413 will be sized and shaped such that the intended stylus 417 would be held snugly within the cavity 415 but could be easily withdrawn by a person. It might be necessary to size the cavity's length so that a small portion of the stylus 417 remains exteriorly of the cavity 415 even when the stylus 417 is fully inserted. Otherwise, it might be difficult to withdraw the stylus. The cavity 415 can be disposed fully within the grip handle 413, or the cavity 415 could utilize the back of the mobile device 411 as part of the inner cavity wall, in conjunction with a hollow part of the grip handle 413. Alternatively, the grip handle 413 and cavity 415 could be integrally formed with the back side of the mobile device 411.

Figure 42:
FIG. 42 shows an end view of a first version of FIG. 41.

FIG. 42 shows an end view of FIG. 41 looking to the left from the right side of the mobile device. An elongated grip handle 413 having a relatively flat grip surface 419 on one side and an elongated round cavity 415 within the grip handle 413 is shown disposed on the back side of a mobile device 411. A stylus 417 is shown inserted in the cavity 415.

Figure 43:
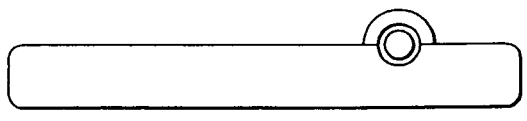
FIG. 43 shows an end view of a second version of FIG. 41.

FIG. 43 shows an end view of an alternative embodiment of FIG. 41 that is semi-recessed into the body of the mobile device 411. In this figure, one can see that the grip handle 413 has been integrally formed with the body or housing of the mobile device 411. A semi-tubular projection provides a grip surface 419. Within the semi-tubular projection and the body or housing of the mobile device, there is a tubular cavity 415 into which a stylus 417 can be placed. The cavity 415 will have an opening to the exterior at the top to receive the stylus 417. There may be a small opening at the bottom to allow drainage of fluid from within the cavity 415 and to allow air flow into or out of the cavity when the stylus 417 is inserted or withdrawn.

In any of the embodiments of FIGS. 41-43, a "click-pen" type mechanism could be provided to eject or receive the stylus 417.

Figure 44:
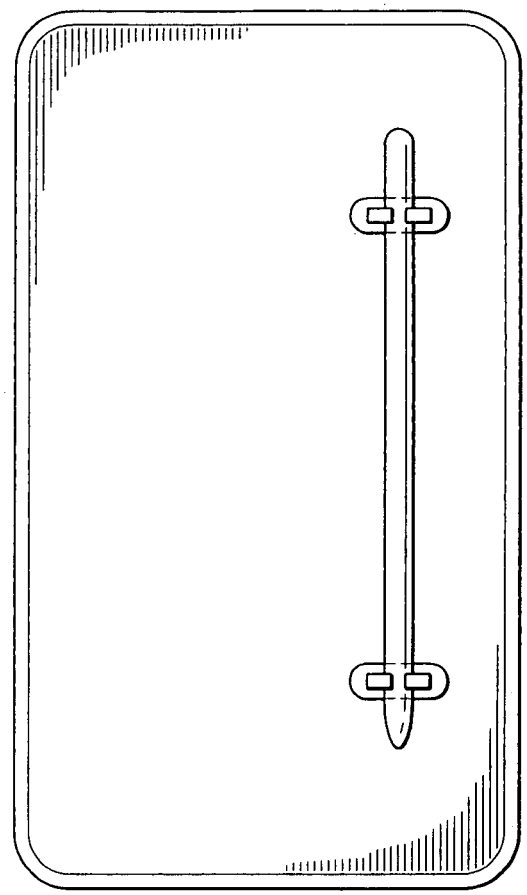
FIG. 44 shows a twenty-first embodiment of the invention.

FIG. 44 shows another preferred embodiment of this invention. In this figure, the stylus 422 can be mounted to the back of the mobile device 421 with clip-style mounting brackets 423 and 424. When mounted, the stylus 422 itself will act as a grip handle. A person's fingers can grasp the mounted stylus 422 while the opposing edge 425 of the mobile device is cradled in the palm of the hand, thereby allowing the mobile device 421 to be comfortably held in one hand. There may be one or more clips utilized to hold the stylus; the choice of the number and size of the clips is a matter of design choice. FIG. 44 shows two relatively small clips 423 and 424 spaced apart a small distance less than the length of the stylus 422. Each clip can have two clip fingers spaced apart sufficiently such that the stylus can be inserted between the clip fingers and will be securely held, but will still be removable by pulling the stylus out of the clip. Alternatively, the fingers may be relatively stiff and the stylus would be inserted into the opening between the fingers from the top or the bottom. The clip will need to be sized such that it securely holds the stylus when inserted, and does not allow the stylus to fall out of the clips during normal use. Yet the clips must allow the stylus to be removed. The clips may be made of a resilient material such as rubber or thermoplastic. The clips can be integrally formed with the back side of the mobile device or they can be separate parts that are attached to the back side of the mobile device. Alternatively, the clips can be arranged to be accessed from the side utilizing the body of the mobile device (or its protective cover) as part of the clip.

Figure 45:
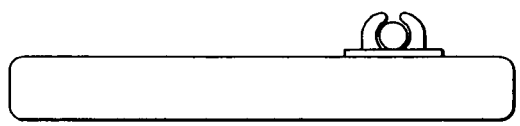
FIG. 45 shows an end view of a first version of FIG. 44.

FIG. 45 shows an end view from the bottom of the mobile device of the embodiment of FIG. 44. In this figure, the bottom clip 424 is shown to be attached to the back surface of the mobile device 421. The clip 424 has two clip fingers that hold a stylus 422 securely but removably. Alternatively, the clips can be arranged to be accessed from the side utilizing the body of the mobile device (or its protective cover) as part of the clip.

Figure 46:
FIG. 46 shows an end view of a second version of FIG. 44.

FIG. 46 shows an end view from the bottom of an alternative embodiment of FIG. 44 wherein the clip fingers are integrally formed with the back side of the mobile device 421 and there is a semi-tubular recessed portion cooperating with the clip fingers 424 to receive the stylus 422 when it is inserted between the clip fingers. Alternatively, the clip fingers could be hinged to fold down into the body of the mobile device 421 when the stylus 422 is removed, providing a flush back side for the mobile device. Alternatively, in the embodiment shown in FIG. 46, one could eliminate the clip fingers and provide a magnet (either on the stylus or the body of the mobile device) to hold the stylus 422 in the recessed portion. Alternatively, the clip fingers shown in FIG. 46 could be rearranged such that the stylus accessed the clip from the side, utilizing the back surface of the mobile device 421 as one of the clip fingers.

Figure 47:
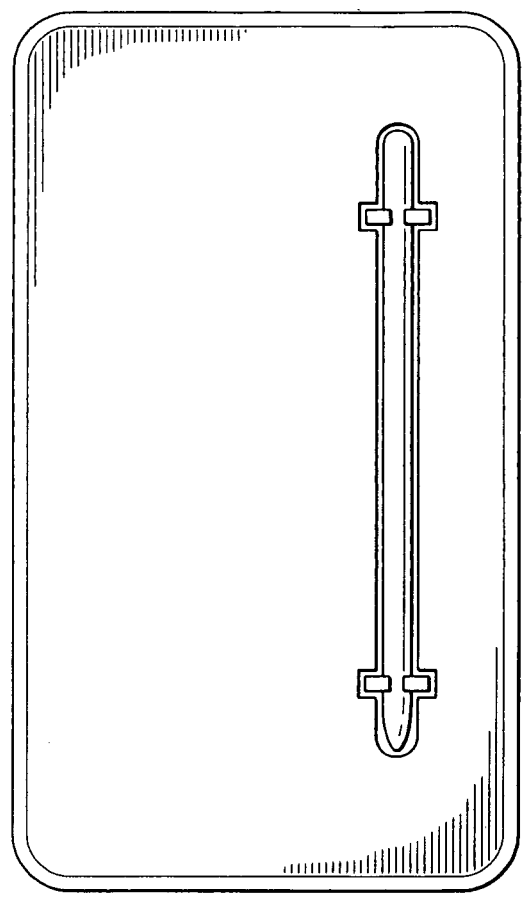
FIG. 47 shows a twenty-second embodiment of the invention.
Figure 48:
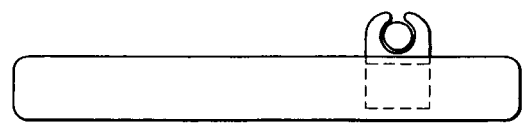
FIG. 48 shows an end view of FIG. 47.

FIG. 47 shows an end view from the bottom of another alternative embodiment of FIG. 44 wherein a small well 426 in the body of the mobile device contains a clip body 424 having clip fingers. The clip fingers are capable of receiving, holding, and releasing a stylus 422. The clip body is disposed within the well 451 in the body of the mobile device 421, and is capable of moving between two positions—a stored position within the well 451 and a raised position wherein some or all of the clip body is situated exteriorly of the body of the mobile device 421. There is also a "click mechanism" (not shown) disposed within the body of the mobile device which allows a person to press the clip body or the stylus (when it is mounted in the clip) and cause the clip body to move from the stored position to the raised position, and vice versa. This click mechanism is similar to that used by a common ballpoint pen to raise or lower the pen out of or into the pen housing. This sort of mechanism is well-known in this art and it would be within the skill of a person of ordinary skill here to utilize such a mechanism as described in this embodiment. When the clip body and the stylus are in the raised position, a person can use the stylus as a grip surface in the manner shown in FIG. 44. When the clip body is in the stored position within the body of the mobile device, it leaves the back side of the mobile device relatively flat so that it can be placed on a flat surface without rocking. Alternatively, the stylus could be held onto the clip body with a magnet (either in the stylus or on the clip body) and the clip fingers could be eliminated or substantially shortened. Alternatively, the clip body could be arranged such that the stylus was mounted from a side with the back side of the mobile device acting as one of the clip fingers.

In FIGS. 44-48, the clips 423 and 424 could be one long clip instead of two or more shorter clips.

Figure 49:
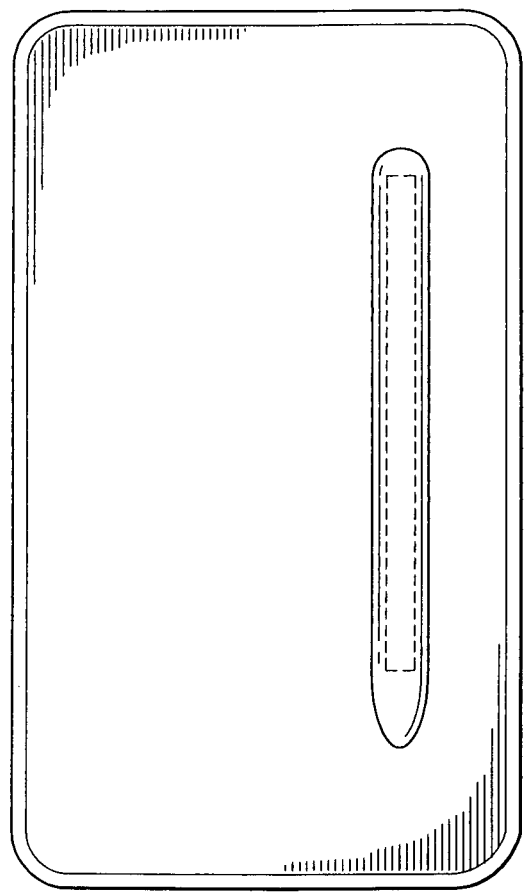
FIG. 49 shows a twenty-third embodiment of the invention.
Figure 50:
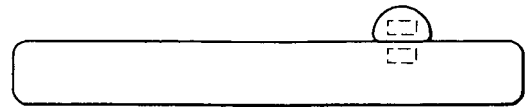
FIG. 50 shows an end view of FIG. 49.

FIG. 49 shows a back view of a mobile device, and FIG. 50 shows an end view from the bottom of FIG. 49 of another alternative embodiment of this invention. The stylus 462 can have disposed within it an elongated magnet 463. This magnet will then cause the stylus to magnetically attach to the back surface of the mobile device 461 if that back surface (or a portion thereof) is a metal surface. The stylus 462 has a side 464 that can serve as a grip surface, particularly if it is somewhat flattened or roughened. Alternatively, the metal surface could be disposed just beneath the outer surface or the protective cover of the mobile device. Alternatively, the stylus could be metal and an elongated magnet can be disposed on the back surface of the mobile device such that it will securely hold the stylus when it is brought into contact with the magnet. Alternatively, there can be a first elongated magnet in the stylus and a second elongated magnet disposed on the back side of the mobile device (or just beneath the back side's surface or just beneath a protective cover). As long as the polarities of the two magnets are opposite, they will attract each other and hold the stylus to the back of the mobile device providing a grip surface for the person to use. The cooperating magnets, or magnet and metal surface, can be elongated, or there can be plural smaller units that are disposed opposite one another when the stylus is mounted on the back side of the mobile device. Alternatively, a magnet or magnetic base could be mounted to the back side of the mobile device with an adhesive or other suitable attachment means.

In any of the embodiments shown in FIGS. 41-50, either side of the stylus and/or clips may be used as a gripping surface. In the embodiments shown in FIGS. 44-48, the clips may be elongated to form the gripping surface(s) or to form part of the gripping surface(s).

Manufacturers of mobile devices have recently introduced mobile devices that are curved such that the display screen is concavely curved and the back surface of the mobile device is convexly curved. The curvature may be in the width dimension or in the length dimension or in both. This curvature of the entire device enables the device to fit more comfortably in the palm of a person's hand. Although the embodiments shown in this disclosure all show flat mobile devices with flat display screens and flat back surfaces, all of the embodiments can easily be adapted to work with a curved mobile device. Embodiments like those shown in this disclosure but adapted for a curved mobile device come within the scope of this invention.

Further, manufacturers are expected to soon introduce mobile devices that are substantially flexible. These flexible mobile devices may be capable of being wound up like a scroll, or even folded. The teachings of this invention would apply equally well to such scrolled or folded mobile devices because, when unscrolled or unfolded, they will still need to be held in a hand. The teachings of this invention can, therefore, be adapted for use on scrolled or folded mobile devices once they become practical.

It should be noted that any embodiment that shows a grip handle, or stylus used as a grip handle, mounted on the back side of the mobile device could also be mounted on the back side of the protective cover of the mobile device.

The foregoing embodiments illustrate only some possible embodiments of this invention. Persons of ordinary skill who read this disclosure will be able to conceive additional embodiments that come within the scope of this invention. This invention is intended to be limited only by the following claims.

I claim:

1. A handle for holding an electronic device with the human hand, comprising:
   1) a relatively flat electronic device having four edges, a first broad flat surface having a display, and a second broad flat surface; and
   2) a first long and narrow concavity in the second broad flat surface wherein the surface of the concavity is curved along the narrower aspect of the concavity.

2. The handle of claim 1 wherein the first long and narrow concavity is generally centered in the second broad flat surface.

3. The handle of claim 1 further comprising a second long and narrow concavity in the second broad flat surface wherein the surface of the second concavity is curved along the narrower aspect of the second concavity, and wherein the first and second long and narrow concavities in the second broad flat surface are parallel to each other and spaced apart from one another.

* * * * *